(12) United States Patent
Kitagata et al.

(10) Patent No.: US 10,402,135 B2
(45) Date of Patent: Sep. 3, 2019

(54) PRINTER LIST GENERATOR, MOBILE TERMINAL, AND PRINTER LIST GENERATION METHOD

(71) Applicant: CANON KABUSHIKI KAISHA, Tokyo (JP)

(72) Inventors: Kei Kitagata, Yokohama (JP); Kenichi Shirai, Ichikawa (JP); Kensuke Hirata, Kawasaki (JP); Takahiko Nishida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 15/301,338

(22) PCT Filed: Apr. 2, 2015

(86) PCT No.: PCT/JP2015/001885
§ 371 (c)(1),
(2) Date: Sep. 30, 2016

(87) PCT Pub. No.: WO2015/151527
PCT Pub. Date: Oct. 8, 2015

(65) Prior Publication Data
US 2017/0109110 A1    Apr. 20, 2017

(30) Foreign Application Priority Data

Apr. 4, 2014 (JP) ................................. 2014-077753

(51) Int. Cl.
*G06F 3/12* (2006.01)

(52) U.S. Cl.
CPC .......... *G06F 3/1261* (2013.01); *G06F 3/1203* (2013.01); *G06F 3/1204* (2013.01);
(Continued)

(58) Field of Classification Search
None
See application file for complete search history.

(56) References Cited

U.S. PATENT DOCUMENTS

| | | | |
|---|---|---|---|
| 2003/0103235 A1* | 6/2003 | Gomi | G06F 3/1229 358/1.15 |
| 2007/0143504 A1* | 6/2007 | Yoshida | H04N 1/00204 710/8 |

(Continued)

FOREIGN PATENT DOCUMENTS

| | | |
|---|---|---|
| JP | 2003-196054 A | 7/2003 |
| JP | 2013-050804 A | 3/2013 |

*Primary Examiner* — Lennin R Rodriguezgonzalez
(74) *Attorney, Agent, or Firm* — Canon USA, Inc., IP Division

(57) ABSTRACT

In the case of displaying, as a list, information pieces on virtual printers registered in multiple respective printing services, the user may become confused when choosing a printer if virtual printers that correspond to a printer are displayed as different printers, consequently reducing user convenience. The present invention relates to searching for virtual printers registered in multiple respective printing services and generating a printer list that displays, as a group, virtual printers corresponding to a printer among the virtual printers thus found, on the basis of printer identifiers of the virtual printers.

14 Claims, 8 Drawing Sheets

(52) U.S. Cl.
CPC .......... *G06F 3/1226* (2013.01); *G06F 3/1232* (2013.01); *G06F 3/1247* (2013.01); *G06F 3/1272* (2013.01); *G06F 3/1287* (2013.01); *G06F 3/1288* (2013.01); *G06F 3/1292* (2013.01)

(56) References Cited

U.S. PATENT DOCUMENTS

2013/0163038 A1   6/2013   Oishi
2014/0006633 A1   1/2014   Uchikawa

\* cited by examiner

FIG. 4A

| USER ID | PRINTER ID | PRINTER NAME | PRINTER CAPABILITIES | IP ADDRESS | STATUS | UPDATE |
|---|---|---|---|---|---|---|
| user@xxx.com | 45787890-34e4-32a4-8921-446655440000 | PRINTER 1 | ... | 192.168.0.1 | ERROR | 1/1/2014 12:30:01 |
| user@xxx.com | 14290453-1ee2-33a5-5647-890771346112 | PRINTER 2 | ... | 192.168.0.5 | - | 12/1/2013 11:20:10 |
| user@xxx.com | 87629123-16c8-32a8-1245-532394780235 | PRINTER 3 | ... | 172.20.0.4 | - | 2/1/2014 3:40:02 |
| user@xxx.com | 33677112-6c5b-8d71-3452-128923434545 | PRINTER 4 | ... | 192.168.0.5 | IDLE | 3/1/2014 5:30:12 |
| user@xxx.com | 76541823-5d6c-7789-1147-564252345234 | PRINTER 5 | ... | 192.168.5.1 | - | 3/1/2014 7:40:03 |

| CONTENTS |
|---|
| PDF |
| DOCX |
| DOC |
| JPEG |
| ... |

| CAPABILITIES |
|---|
| NUP |
| DOUBLE SIDED |
| COLOR |
| ... |
| ... |

| NAME |
|---|
| X |
| ... |

FIG. 4B

| SERVICE | SERVICE URL | CHARGE |
|---|---|---|
| COMPANY X | Http://X.com | CHARGED |
| COMPANY Y | Http://Y.com | FREE |
| COMPANY Z | Http://Z.co.jp | CHARGED |
| ... | ... | ... |

| PRIORITY |
|---|
| CHARGED / FREE |
| PRIORITY GIVEN TO LOCAL PRINTER |
| PRIORITY SERVICE |

FIG. 4C

| PRINTER ID | IP ADDRESS | STATUS | VENDOR |
|---|---|---|---|
| 45787890-34e4-32a4-5647-446655440000 | 192.168.0.1 | NOTIFIED | × |

| CAPABILITIES |
|---|
| NUP |
| DOUBLE SIDED |
| COLOR |
| ... |
| ... |

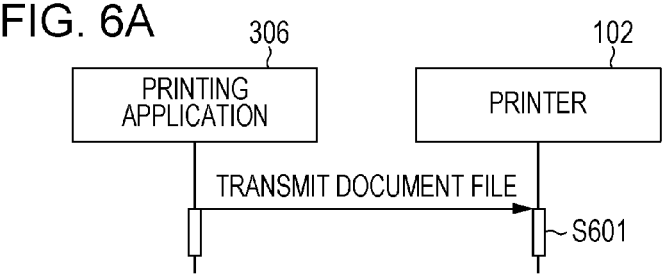
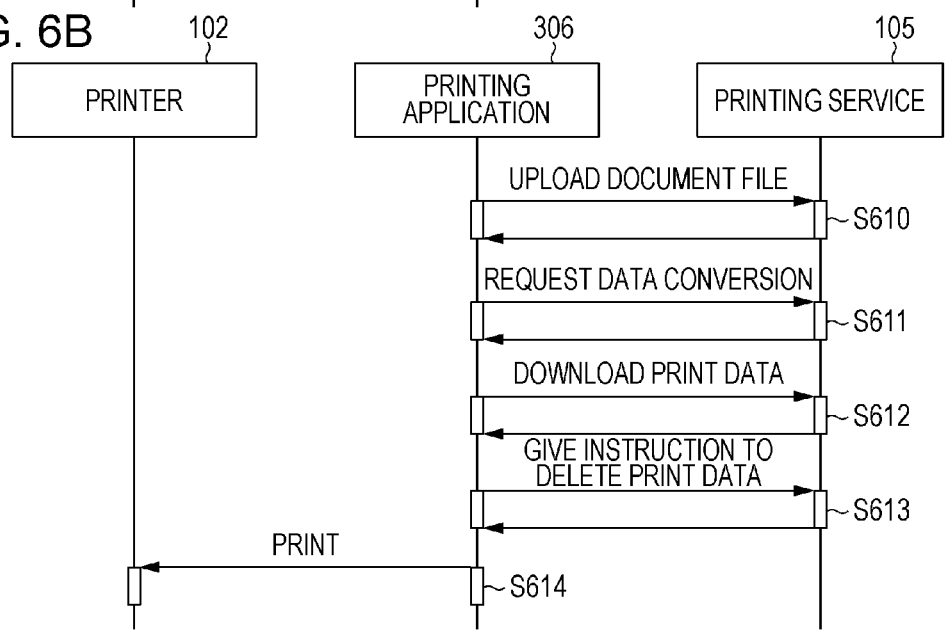
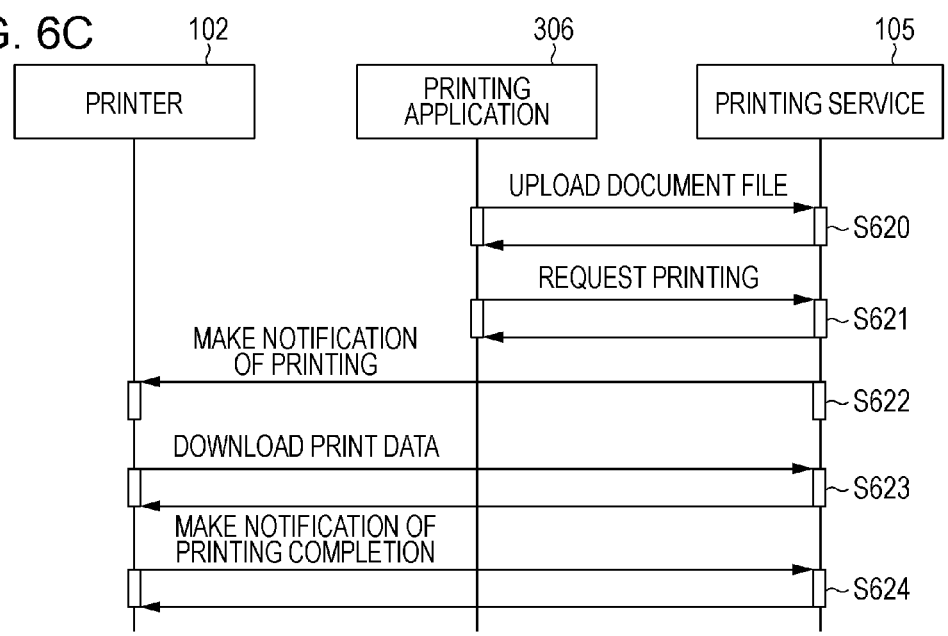

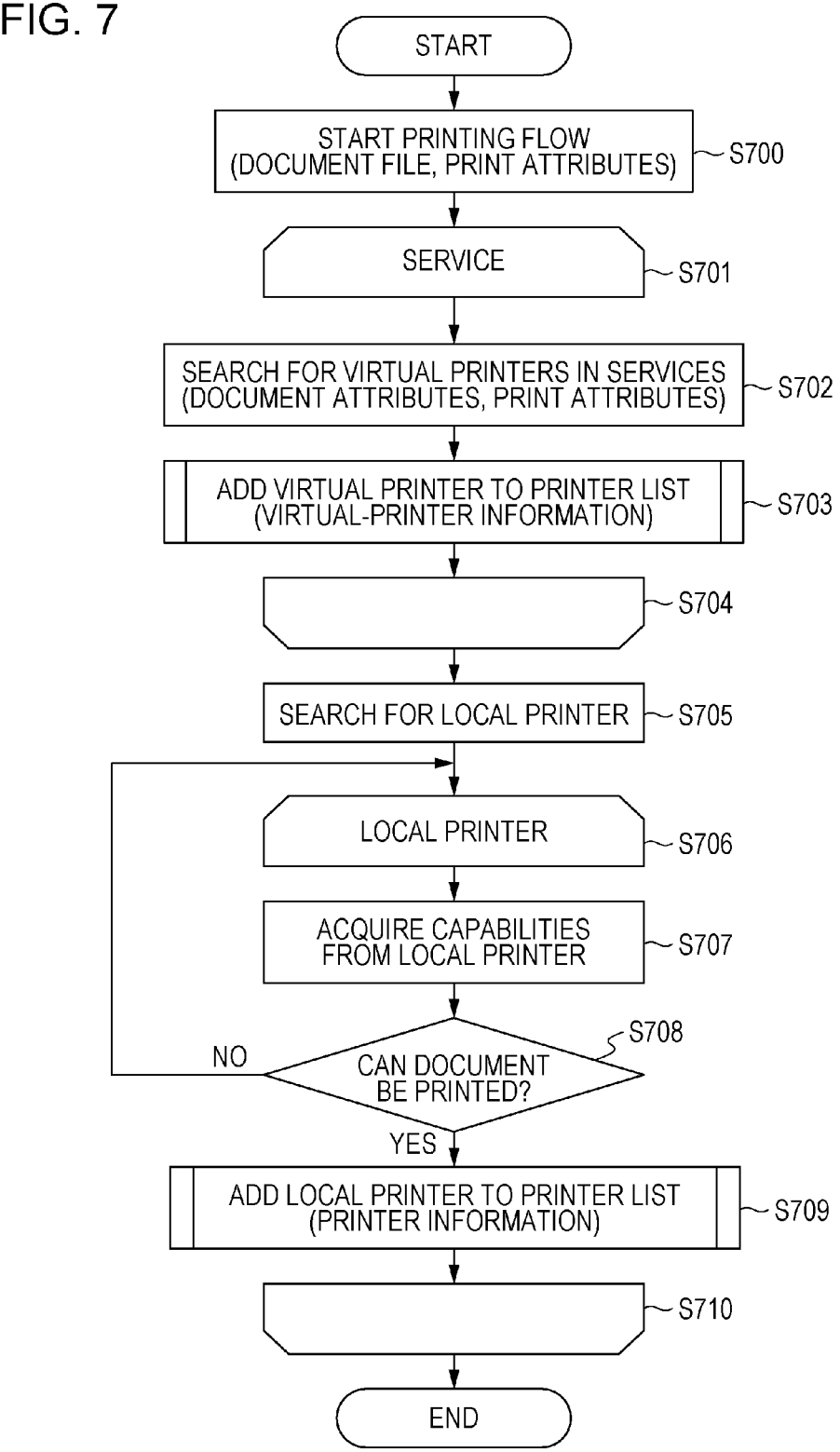

PRINTER LIST GENERATOR, MOBILE TERMINAL, AND PRINTER LIST GENERATION METHOD

CROSS REFERENCE TO RELATED APPLICATIONS

This application is a National Stage filing of International Application No. PCT/JP2015/001885 filed Apr. 2, 2015, which claims the benefit of priority from Japanese Patent Application No. 2014-077753 filed Apr. 4, 2014, the disclosures of each of which are hereby incorporated by reference herein in their entirety.

TECHNICAL FIELD

The present invention relates to a generator that generates a printer list for displaying, as a list, virtual printers acquired from multiple printing services.

BACKGROUND ART

In some known techniques, when a client transmits a print instruction to a server, the server, which has received the print instruction, converts print-target contents into print data and executes a printing process by using the obtained print data.

In PTL 1, when a client device receives, from a user, a request for printing application data created by an application of a server, the client device transmits, to the application, a request for generating print data on the basis of the application data. Upon receipt of information on the client, which has issued the generation request, and the generation request, the server generates print data with reference to print control information corresponding to the client information. In this way, the server according to PTL 1 provides a service for generating print data.

As described above, such a technique, in which a server provides a printing service to a client, already exists. Cloud computing has been receiving considerable attention in recent years as another technique in which a server provides a service to a client. The main feature of cloud computing is that requests from multiple clients can be processed in parallel in such a way as to carry out data conversion and data processing in a distributed manner by using many computing resources. There are numerous vendors that provide various kinds of service by implementing web services on cloud computing environments.

In a known technique, a mobile terminal such as a smartphone directly transmits print data to a printer to carry out printing. In this method, document data needs to be converted into print data in the mobile terminal, but the mobile terminal does not have sufficient memory in some cases. A web server according to PTL 2 transmits, upon receipt of a print request from an image forming device, a print instruction to a printing service in order to generate print data. The image forming device acquires the print data from the printing service and prints the print data while informing the printing service of the print state every time the print state changes. Such a system for printing by the combination of a mobile terminal, a printer, and a server is called cloud printing.

In some techniques, information pieces on virtual printers registered in multiple printing services are obtained by searching for printers and are displayed as a list. In such a technique, virtual printers registered in the multiple printing services are displayed as different printers. However, when the same printer is registered as a virtual printer in different printing services, the printer is displayed in the list as different printers, which are the same printer in actuality. This may confuse a user when choosing a printer, consequently reducing user convenience. In some cases, pieces of information on printers obtained by searching local-area networks are displayed together in the above list. In this case, the virtual printers registered in the multiple printing services and the printers found in the local-area networks are displayed as different printers. Accordingly, printers that are the same printer in actuality are displayed as different printers in the list. This may confuse a user when choosing a printer, consequently reducing user convenience.

CITATION LIST

Patent Literature

PTL 1: Japanese Patent Laid-Open No. 2003-196054
PTL 2: Japanese Patent Laid-Open No. 2013-050804

SUMMARY OF INVENTION

To solve the above-described problems, an aspect of the present invention provides a printer list generator including a search unit configured to search for virtual printers registered in multiple respective printing services; and a generation unit configured to generate a printer list that displays, as a group, virtual printers corresponding to a printer among the virtual printers found by the search unit, on the basis of printer identifiers of the virtual printers.

Further features of the present invention will become apparent from the following description of exemplary embodiments with reference to the attached drawings.

BRIEF DESCRIPTION OF DRAWINGS

FIG. 4A provides table structures managed in the print server.
FIG. 4B provides table structures managed in the mobile terminal.
FIG. 4C provides table structures managed in the printer.
FIG. 6A illustrates a printing sequence.
FIG. 6B illustrates a printing sequence.
FIG. 6C illustrates a printing sequence.
FIG. 7 is a flowchart of a process for generating a printer list.

DESCRIPTION OF EMBODIMENTS

First Embodiment

System Configuration

Figure 1:
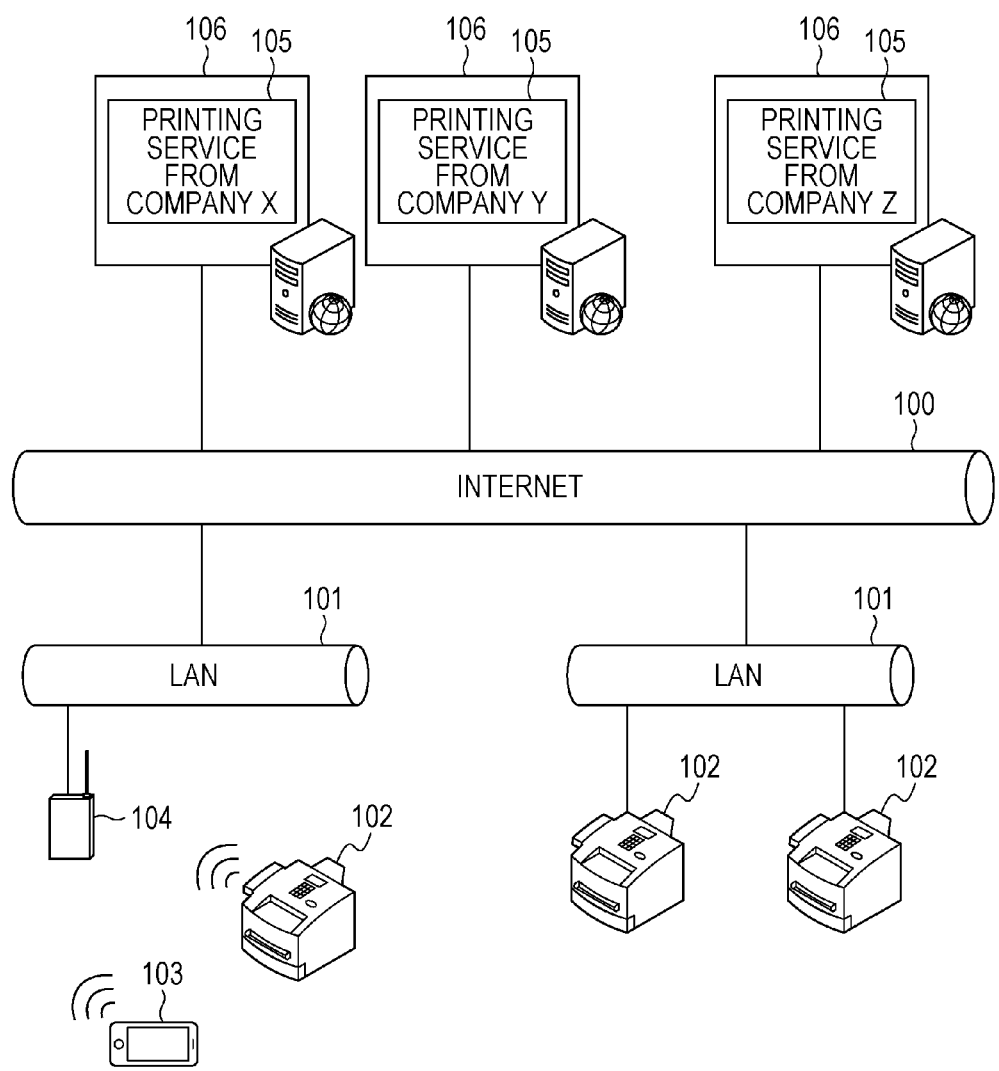
FIG. 1 is a system configuration diagram.

FIG. 1 is a diagram illustrating the entire configuration of a mobile printing system according to this embodiment. It is assumed that multiple printers 102 and a mobile terminal 103 are connected to each other via wired or wireless local-area networks (LANs) 101. Each of the printers 102 and the mobile terminal 103 can access the Internet 100 via a corresponding one of the LANs 101 and thereby access multiple printing services 105 provided by different companies. The mobile terminal 103 is assumed to be connected to the networks via a wireless-LAN terminal 104 in this embodiment but may be connected to the networks via a wireless network provided by a mobile data communication carrier. In addition, the printers 102 and the mobile terminal 103 do not have to directly communicate with each other as long as the mobile terminal 103 and the printing services 105 are connected to each other and each of the printers 102 and the printing services 105 are connected to each other via the Internet 100. The wireless-LAN terminal 104 is a wireless-LAN base unit having a general network router function and provides a wireless LAN in a household or an office. Each of the printing services 105 is a cloud service in which content data transmitted by the mobile terminal 103 is converted into data in a data format (e.g., page-description language (PDL) data) that can be read by a corresponding one of the printers 102; the PDL data is transmitted to the printer 102; and the printer 102 prints the PDL data. Each of the printing services 105 has a function of storing information pieces on the respective registered printers 102 as virtual-printer information pieces 400. With this function, the printing service 105 can register a printer according to an instruction from the mobile terminal 103 and issue a print instruction to a virtual printer.

It is assumed that the number of printing services 105 included in this embodiment is more than one and various services are provided by vendors providing the printing services 105. Although the printing services 105 are assumed to operate on respective print servers 106 in this embodiment, the operation of print servers is not limited to this and multiple printing services may operate on a single print server.

Hardware Configuration of Mobile Terminal

Figure 2A:
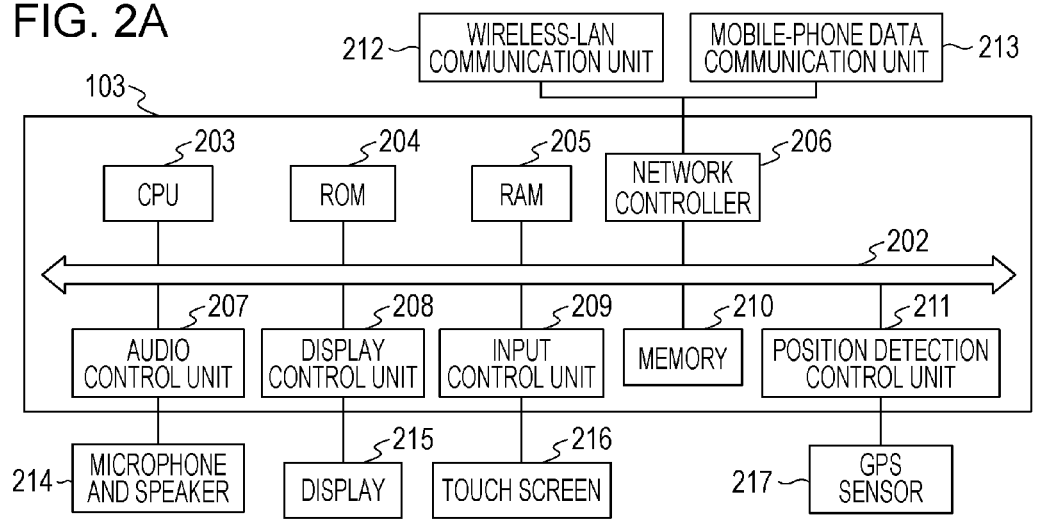
FIG. 2A is a diagram illustrating a hardware configuration of a mobile terminal.

FIG. 2A is an example of a diagram illustrating a hardware configuration of the mobile terminal 103. The components of the mobile terminal 103 are connected to a system bus 202.

A read-only memory (ROM) 204 stores an operating system (OS) and application programs for controlling conversations and data communications. A central processing unit (CPU) 203 functions as a processing unit that carries out various processes, to be described later, by executing the computer programs. Examples of the application programs for controlling data communications are a mail program and a web browser. A random-access memory (RAM) 205 serves as a working memory area used by the CPU 203 in order to execute the programs. The RAM 205 serves also as a memory that temporarily stores, for example, web page data acquired from a web server via the web browser and authentication information used for access to web services. A memory 210 is a nonvolatile memory for storing various operation mode settings and operation logs necessary to be retained after the mobile terminal 103 is restarted.

A network controller 206 controls communications of a wireless-LAN communication unit 212 and a mobile-phone data communication unit 213 the function of which is to join a wireless communication network provided by the mobile-phone carrier. In general, when the mobile terminal 103 joins a wireless LAN, the network controller 206 gives a higher priority to the wireless-LAN connection. When the mobile terminal 103 moves out of the network area of a wireless LAN, the mobile terminal 103 joins the wireless communication network provided by the mobile-phone carrier. An audio control unit 207 is mainly used when a user is talking on the phone while using a phone call application. The audio control unit 207 assists in input and output of audio data between the conversation application and a microphone and speaker 214. A display control unit 208 controls information to be output on a display 215 of the mobile terminal 103. An input control unit 209 controls information selected by a user using a button or a touch panel 216 of the mobile terminal 103. The applications in the mobile terminal 103 provide the user with network communication information and various kinds of information on the mobile terminal 103 by using the audio control unit 207, the display control unit 208, and the input control unit 209. A position detection control unit 211 acquires position information on the mobile terminal 103 from a global positioning system (GPS) sensor 217 and provides the position information to the OS. These controls are performed in such a way that the CPU 203 executes appropriate computer programs including the OS and the applications.

Hardware Configuration of Printing Service

Figure 2B:
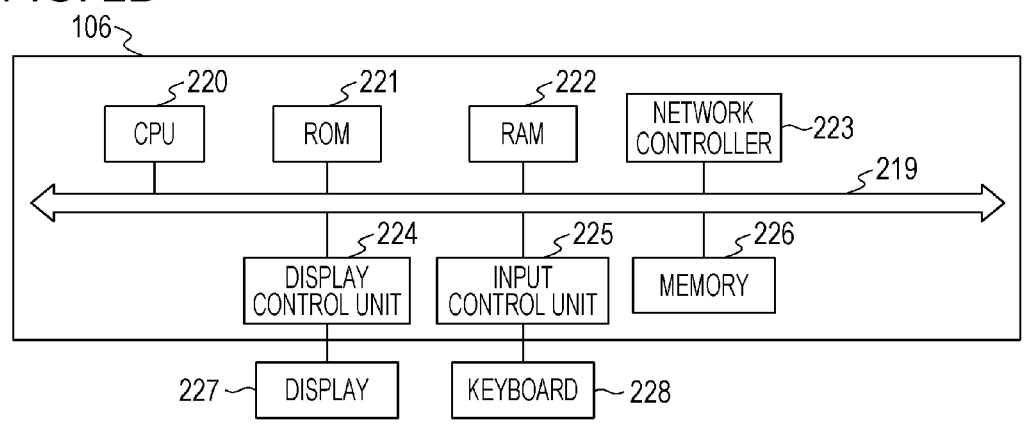
FIG. 2B is a diagram illustrating a hardware configuration of a print server.

FIG. 2B is a diagram illustrating an example of a hardware configuration of each of the print servers 106. Each of the print servers 106 providing a corresponding one of the printing services 105 of this embodiment may be of a single device or a system including multiple devices. In this embodiment, a description is given assuming that the components of the print server 106 are connected to each other via a system bus 219. A CPU 220 executes application programs, a print driver program, an operating system, and a program for the mobile printing system of this embodiment, which are stored in a memory 226. In addition, the CPU 220 controls a RAM 222 so that the RAM 222 temporarily stores information and files necessary to execute computer programs. The CPU 220 opens various registered windows according to the commands issued by using a mouse cursor or the like displayed on a display 227 and carries out various kinds of data processing. A ROM 221 stores programs such as a basic input/output (I/O) program and various kinds of data such as font data and template data to be used in document processing. The RAM 222 is a temporary storage that serves as a main memory or a working area of the CPU 220. A display control unit 224 controls information to be output to and displayed on the display 227. An input control unit 225 receives information input by using a keyboard 228 and communicates with the CPU 220. The memory 226 is an external memory that serves as a bulk memory and stores the application programs, the print driver program, the OS, and the like. The keyboard 228 is a command input unit, used by the user in order to input, for example, a command to the device.

Hardware Configuration of Printer

Figure 2C:
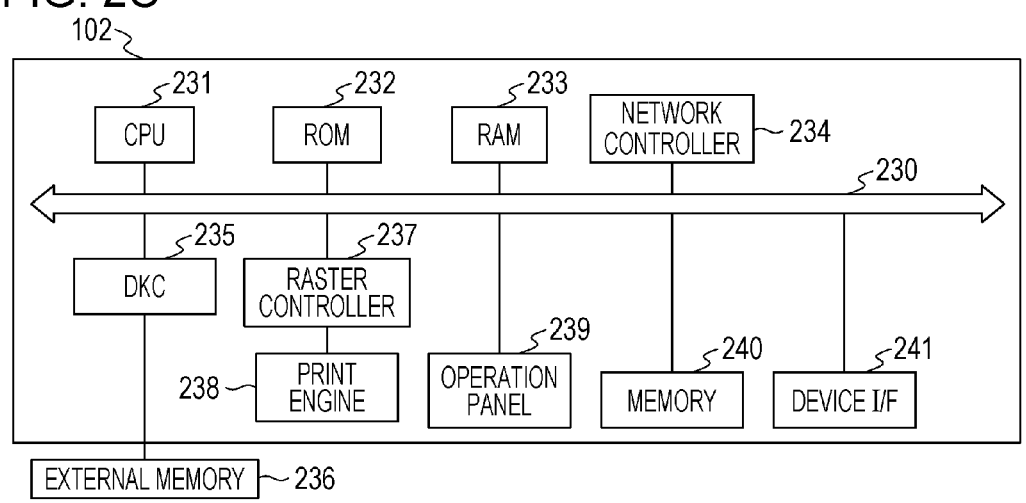
FIG. 2C is a diagram illustrating a hardware configuration of a printer.

FIG. 2C is a diagram illustrating a hardware configuration of each of the printers 102. The components of the printer 102 are connected to a system bus 230. A CPU 231 controls the entire device and controls all the accesses to the various devices connected to the system bus 230. The CPU 231 controls the entire device by executing a control program stored in a ROM 232 or an external memory 236 connected via a DKC (disk controller) 235. A RAM 233 serves as, for example, a main memory or a working area of the CPU 231. A memory 240 is an external memory that serves as a bulk memory and stores computer programs according to this embodiment and the like. An operation panel (operation unit) 239 is a touch panel. The operation panel 239, for example, displays an operation screen and receives a command from a user via the operation screen. In addition, the operation panel 239 displays the operation mode setting, the operation state, and the like of the printer 102 and buttons or the like to be used for operations such as setting print settings, for example. A network controller 234 is a network interface card (NIC) and transmits and receives data to and from external devices. A print engine 238 is a printing unit that carries out printing using, for example, an electrophotographic (laser beam), inkjet, or sublimation (thermal transfer) printing technique. A raster controller 237 converts print data (PDL data) written in a PDL or a portable document format (PDF) language into image data. A device interface (I/F) 241 is a connection interface between the printer 102 and external devices connectable via a universal serial bus (USB), for example.

Software Configuration of Printing Service

Figure 3A:
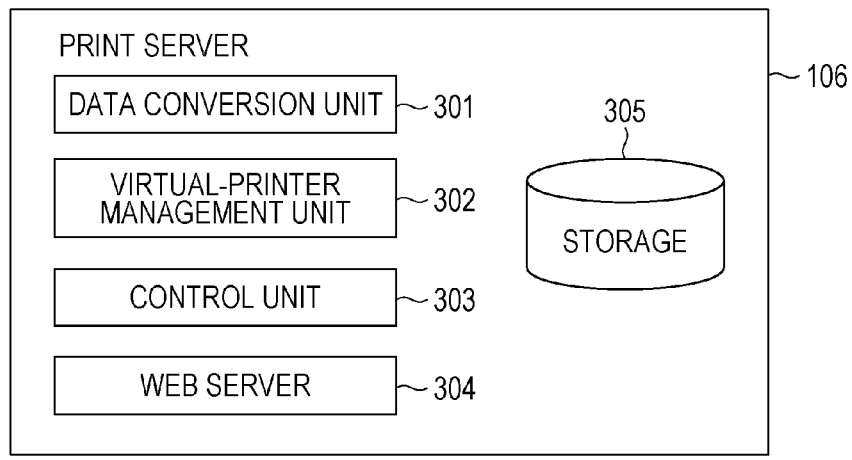
FIG. 3A is a diagram illustrating a software component configuration of the print server.

FIG. 3A is a diagram illustrating a software configuration of each of the printing services 105. The software modules are stored in the memory 226 illustrated in FIG. 2B and function as processing units 301 to 304, to be described later, by loading appropriate computer programs into the RAM 222 and executing the computer programs.

A data conversion unit 301 converts a document file received from the mobile terminal 103 into print data (e.g., PDL data) in a data format that can be printed by a corresponding one of the printers 102. A virtual-printer management unit 302 stores information on virtual printers, to be described later with reference to FIG. 4A, in a storage 305. The virtual-printer management unit 302 reads out an appropriate one of virtual-printer information pieces 400 from the storage 305 in response to a request from an external device and returns the virtual-printer information piece 400. A control unit 303 transmits and receives information on a web server 304 to and from the virtual-printer management unit 302 and requests the data conversion unit 301 to perform a conversion operation. In addition, the control unit 303 transmits the print data obtained by conversion by the data conversion unit 301, in response to a print data acquisition request from any of the printers 102 and the mobile terminal 103. It is also assumed that the control unit 303 directly transmits the print data to a corresponding one of the printers 102. The web server 304 provides various interfaces, to be described later, so as to receive printer registration and verify the validity of received information. The storage 305 stores information held by the printing service 105 to be described later with reference to FIG. 4A.

Software Configuration of Mobile Terminal

Figure 3B:
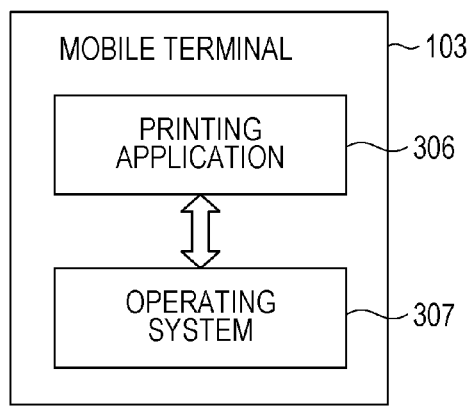
FIG. 3B is a diagram illustrating a software component configuration of the mobile terminal.

FIG. 3B is a diagram illustrating a software configuration of the mobile terminal 103. The software modules are stored in the memory 210 illustrated in FIG. 2A. The CPU 203 loads appropriate computer programs into the RAM 205 and executes the programs. In this embodiment, a printing application 306 is installed in an OS 307 of the mobile terminal 103, and processes according to this embodiment are carried out by the printing application 306. The network controller 206 controlled by the OS 307 operates when the printing application 306 communicates with the printers 102 and the printing services 105. The printing application 306 communicates with a corresponding one of the printers 102 and the printing services 105 according to an operation by the user in order to carry out a process for, for example, registering a printer, uploading a document file, or instructing printing.

Software Configuration of Printer

Figure 3C:
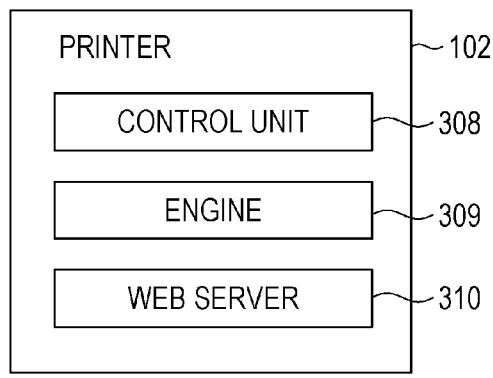
FIG. 3C is a diagram illustrating a software component configuration of the printer.

FIG. 3C is a diagram illustrating a software configuration of each of the printers 102. The software modules of the printer 102 are stored in the memory 240 illustrated in FIG. 2C. The CPU 231 functions as processing units 308 and 310, to be described later, by loading appropriate computer programs into the RAM 233 and executing the programs as described above.

The control unit 308 responds to a request received at the web server 310, by providing printer information and print attributes illustrated in FIG. 4C. An engine 309 carries out a printing process by using a print image obtained by interpreting and converting print data transmitted from any of the mobile terminal 103 and the printing services 105. The web server 310 receives a printer information acquisition request from any of the mobile terminal 103 and the printing services 105.

Data Tables of Printing Service

FIG. 4A provides multiple data tables stored in the memory 226 by each of the printing services 105. Alternatively, the data tables may be stored in a different server that can communicate with the printing service 105 via the Internet 100 or one of the LANs 101 instead of being stored in the memory 226 of the corresponding print server 106. The multiple data tables held by the printing service 105 are a table including virtual-printer information pieces 400, a table including support content information pieces 420, a table including print attributes 421, and a table including vendor information pieces 422.

The printing service 105 receives the virtual-printer information pieces 400 included in the corresponding table, via the web server 304 upon registration of the virtual-printer information pieces 400 and stores the virtual-printer information pieces 400 in the storage 305. The printing service 105 receives a user identifier (user ID) 401 when a client accesses the web server 304 and uses the user ID 401 in order to identify the user who has made the request. In this embodiment, the virtual-printer information pieces 400 are stored for each user ID 401. A printer identifier (printer ID) 402 uniquely identifies each of the printers 102 in the entire system. A method to be employed for issuing the printer IDs 402 is not particularly limited in this embodiment. Each printer ID 402 may be set for the printer 102 in advance or be issued by the printer 102 or an unillustrated ID management server as long as each printer ID 402 is unique. A printer name 403 is set by a user when the user registers a virtual printer. Printer capabilities 404 indicate print attribute information that is selectable when using the printer 102. An Internet protocol address (IP address) 405 identifies the device on the network. A status 406 indicates information on the state of the printer 102 acquired by the printing service 105 from the printer 102.

The support content information pieces 420, the print attributes 421, and the vendor information pieces 422 are basic information pieces held in advance by the printing service 105. Contents 407 indicate information on a document format that can be processed by the printing service 105. Capabilities 408 indicate print attribute information that is selectable when using the printing service 105. A name 409 indicates the name of a vendor providing the printing service 105.

Data Tables of Mobile Terminal

FIG. 4B provides data tables stored in the memory 210 by the printing application 306 in the mobile terminal 103. The data tables held by the mobile terminal 103 are a table including printing service information pieces 423 and a table including priority information pieces 424. A service 410 indicates the name of a vendor registered in the printing application 306. A service uniform resource locator (service URL) 411 indicates the URL that identifies the server providing a corresponding service 410. A charge 412 indicates the charge for the corresponding service 410 registered in the printing application 306. A priority 413 indicates information to be used by the printing application 306 in order to determine which service to choose among the services 410.

Data Tables of Printer

FIG. 4C provides data tables stored in the memory 240 by each of the printers 102. The data tables held by the printer 102 are a table including printer information pieces 425 and a table including print attributes 426. A printer ID 414 uniquely identifies the printer 102. An IP address 416 is set for the printer 102. A status 417 indicates information on the state of the printer 102. A vendor 418 indicates information on the manufacturing vendor of the printer 102. Capabilities 415 indicate information on print attributes that can be implemented by the printer 102.

Examples of Screen Displayed on Mobile Terminal

Figure 5:
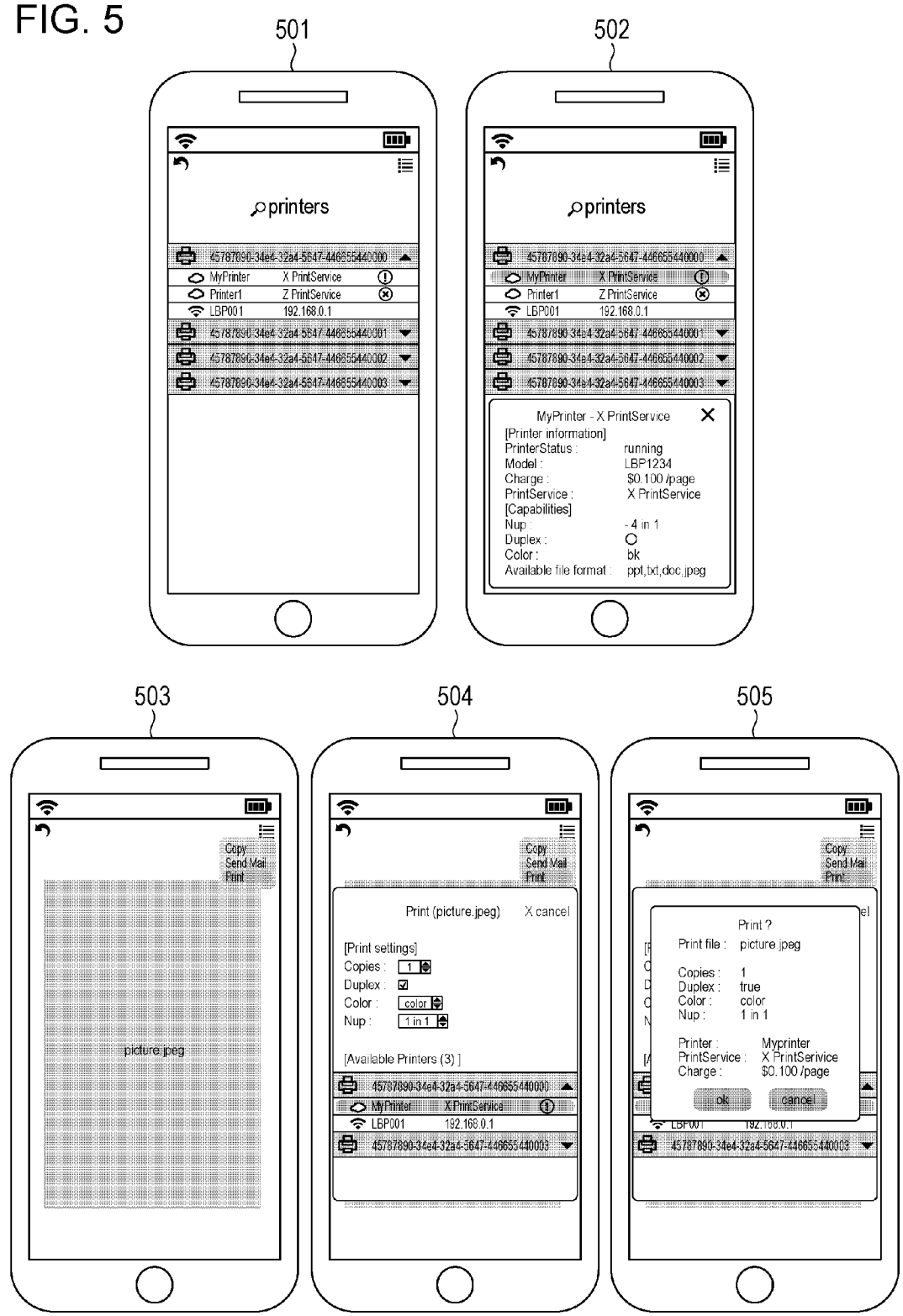
FIG. 5 provides examples of printing application screens.

FIG. 5 provides examples of screens displayed on the display 215 by the printing application 306 of the mobile terminal 103. A printer list screen 501 is an example of a screen displaying, as a list, the printers (local printers) 102 that are found in the local-network searching and virtual printers corresponding to the virtual-printer information pieces 400 acquired from the printing services 105 of the vendors. A printer list screen 502 is an example of a screen displaying, when one of the printing services 105 is selected, the virtual-printer information piece 400 on each of the virtual printers registered in the selected printing service 105 and the vendor 409 of each of the virtual printers.

A content data display screen 503 is an example of a screen displaying a preview image of content data selected as print-target contents. Upon selection of Print from the menu in this screen by a user, a print attribute selection screen 504 is displayed. The print attribute selection screen 504 is an example of a screen in which the user selects the print attributes for printing the content data (that is, the user sets print settings for the number of copies, single-sided/double-sided printing, color/monochrome printing, and N-up printing, for example) before printing. Upon selection of a printer on the print attribute selection screen 504, a print confirmation screen 505 is displayed so that the user confirms the print settings before carrying out the printing process. When the user presses an OK button after confirming the print settings, the printing process is carried out.

Printing Process Sequence

FIGS. 6A to 6C are each a sequence diagram for illustrating a data flow in the printing process.

FIG. 6A illustrates a sequence in the case of carrying out direct printing by using the printing application 306. When the document file specified as a print target by a user can directly be printed by the printer 102 specified by the user as a destination printer, the printing application 306 of the mobile terminal 103 carries out direct printing.

In step S601, the printing application 306 transmits the document file specified as a print target, to the printer 102 specified as a destination printer. The printer 102 receives and prints the document file transmitted by the printing application 306.

FIG. 6B illustrates a sequence of the printing process in the case where the printer 102 specified by the user as a destination printer does not have a cloud printing function (that is, the case where the printer 102 cannot directly receive data from the printing service 105). As described below, in this case, the print data generated by the printing service 105 is transmitted to the printer 102 via the printing application 306 and is printed by the printer 102.

In step S610, the printing application 306 uploads the document file specified as a print target by the user, to the printing service 105. The printing service 105 receives the document file uploaded by the printing application 306 and notifies, upon completion of the reception, the printing application 306 that the document file has been received.

Upon completion of the upload of the document file in step 610, the printing application 306 issues a request for the data conversion of the uploaded document file, to the printing service 105 in step S611. Upon receipt of the data conversion request, the printing service 105 generates print data by converting the document file to data in a data format that can be printed by the printer 102. Upon completion of the generation of the print data, the printing service 105 notifies the printing application 306 of the completion. At the same time, the printing service 105 notifies the printing application 306 of the download URL for downloading the print data obtained by the conversion. The number of download URLs may be more than one.

In step S612, the printing application 306 transmits a request for downloading the print data, to the printing service 105 by using the download. URL received in step S611. Upon receipt of the download request, the printing service 105 transmits the print data generated in step S611, to the printing application 306. Through the above operation, the print data obtained by the conversion to data in a format that can be printed by the printer 102 is transferred from the printing service 105 to the printing application 306. When the number of the download URLs for the print data is more than one, the operation in step S612 is performed more than once.

In step S613, the printing application 306 instructs the printing service 105 to delete the print data in the printing service 105. This is because the printing service 105 no longer needs to hold the print data after the completion of the download of the print data in step S612. In this embodiment, such a sequence diagram, in which step S613 is performed immediately after step S612, is provided. However, step S613 may be performed at any timing as long as step S613 is performed after step S612. For the instruction to delete the print data, the download URL is used. When the number of download URLs is more than one, the download URLs may be managed by tagging the URLs as a download URL group or using IDs so that the deletion can be instructed with a single instruction. Upon receipt of the instruction to delete the print data from the printing application 306, the printing service 105 performs a deletion operation on the specified print data. Upon completion of the deletion, the printing service 105 notifies the printing application 306 that the deletion of the print data has been completed.

In step S614, the printing application 306 transmits the print data downloaded in step S612, to the printer 102 and instructs the printer 102 to print the print data. The printer 102 carries out the printing process by using the print data received from the printing application 306.

FIG. 6C illustrates a sequence of the printing process in the case where the printer specified as a destination printer by the user has a cloud printing function (that is, the case where the printer 102 can directly receive data from the printing service 105). As described below, in this case, the printer 102 directly downloads and prints the print data generated by the printing service 105.

In step S620, the printing application 306 uploads, to the printing service 105, the document file in the mobile terminal 103 specified as a print target by the user. The printing service 105 receives the document file uploaded by the printing application 306. Upon completion of the reception, the printing service 105 notifies the printing application 306 that the document file has been received.

Upon completion of the upload process of the document file in step S620, the printing application 306 issues a request for printing the uploaded file, to the printing service 105 in step S621. Upon receipt of the print request, the printing service 105 generates print data by converting the document file to data in a data format that can be printed by the printer 102. Upon completion of the generation of the print data, the printing service 105 notifies the printer 102 that the generation of the print data has been completed, in step S622. At the same time, the printing service 105 notifies the printer 102 of the download URL for downloading the print data obtained by the conversion. The number of download URLs for the print data may be more than one.

In step S623, the printer 102 transmits, to the printing service 105, a request for downloading the print data, by using the download URL received in step S622. Upon receipt of the download request from the printer 102, the printing service 105 transmits the print data generated in step S621, to the printer 102. When the number of the download URLs for the print data is more than one, the operation in step S623 is performed more than once. The printer 102 carries out the printing process by using the downloaded print data.

Upon completion of the printing of the print data downloaded in step S623, the printer 102 transmits a printing completion notification to the printing service 105 in step S624. Upon receipt of the printing completion notification, the printing service 105 performs a deletion operation on the print data in the printing service 105. To instruct the printing service 105 to delete the print data by transmitting the printing completion notification, the printer 102 specifies the deletion-target print data by using the download URL used in step S623. When the number of download URLs is more than one, the download URLs may be managed by tagging the URLs as a download URL group or using IDs so that the deletion can be instructed with a single instruction. Upon receipt of the printing completion notification, the printing service 105 notifies the printer 102 that the printing completion notification has been received.

Printer List Generation Process

A method of generating a printer list to be displayed as the screen 501 in FIG. 5 is described below. FIG. 7 is a flowchart illustrating a process in which, when the user specifies a document file as a print target in the mobile terminal 103 and a print instruction is issued, the printing application 306 receives the print instruction and generates a list of printers that can print the document file. When the mobile terminal 103 displays the generated printer list as the screen 501 in FIG. 5 and the user chooses a destination printer from the printer list, an appropriate one of the printing processes illustrated with reference to FIGS. 6A to 6C is carried out.

In step S700, the printing application 306 receives a print instruction. The information received with the print instruction includes the document file specified as a print target by the user and print attributes. The print-target document file is held in the mobile terminal 103 and specified by the user. The print attributes are specified by the user on the print attribute selection screen 504 and include settings for multi-page-per-sheet printing (N-up) printing, two-sided/one-sided printing, and color/monochrome printing, for example.

Steps S701 and S704 indicate loop limit. The printing application 306 repeatedly performs the operations in steps S702 and S703 on the services 410 one by one that are registered in the printing service information pieces 423.

In step S702, the printing application 306 issues a virtual-printer search request to the service URL 411 of the service 410 that is the current operation target. The document attributes, such as the data format of the print-target document file received by the printing application 306 in step S700, and print attributes are specified as search conditions, in the virtual-printer search request. Upon receipt of the virtual-printer search request from the printing application 306, the printing service 105 searches for virtual printers that can print the document file on the basis of the virtual-printer information pieces 400 registered in the printing service 105, by using the document attributes and print attributes specified as the search conditions. Specifically, the printing service 105 searches for, on the basis of the virtual-printer information pieces 400, virtual printers for which the data format specified as the search condition is registered in the support contents 420 and for which all the print attributes specified as the search conditions are registered in the print attribute information pieces 421. The printing service 105 transmits the information on each virtual printer found on the basis of the virtual-printer information pieces 400 in accordance with the search conditions, to the printing application 306 as a response to the virtual-printer search request.

In step S703, the printing application 306 adds, to the printer list, the virtual-printer information pieces 400 received as a response to the virtual-printer search request from the printing service 105. The virtual printers found by the printing service 105 in step S702 can print the document file specified as a print target by the user, by using the specified print attributes, and the number of the virtual printers thus found may be zero or more. Accordingly, the operation of adding the virtual printer to the printer list in step S703 is performed. The number of times the operation is performed corresponds to the number of virtual printers found by the printing service 105 in step S702. The detailed flow of the printer-list addition process in step S703 is described later with reference to FIG. 8.

In step S705, the printing application 306 searches for local printers. Specifically, the printing application 306 searches for local printers to which the mobile terminal 103 can have a direct network connection. A printer search method may be one in which the printing application 306 performs multicast on the LAN to which the mobile terminal 103 is connected and searches for the printer 102 that has responded to the multicast, or one in which the printing application 306 specifies the IP address of a particular one of the printers 102 and searches for the printer 102. As a result of the local-printer search in step S705, the printing application 306 acquires connection information on the local printer (e.g., the IP address or the URL). The number of printers found in the local-printer search in step S705 may be zero or more.

Steps S706 and S710 indicate loop limit. The printing application 306 repeatedly performs the operations in steps S707 to S709 on the local printers one by one that have been found in the local-printer search in step S705.

In step S707, the printing application 306 issues a capability acquisition request to the printer 102 that has been found in step S705 and that is an operation target in step S706. The printer 102 that has received the capability acquisition request transmits the printer information pieces 425 and the print attributes 426 to the printing application 306 as a response to the request.

In step S708, the printing application 306 determines whether or not the printer 102 can print the print-target document file in accordance with the print attributes specified in step S700, on the basis of the print attributes of the printer 102 acquired in step S707 (i.e., the function of the printer). Specifically, the printing application 306 determines that the printer 102 is capable of printing when all the print attributes received in step S700 are included in the print attributes 426 of the printer 102 acquired in step S707. In contrast, when one or more of the print attributes received in step S700 are not included in the print attributes 426 of the printer 102, the printing application 306 determines that the printer 102 is not capable of printing. When the printing application 306 determines that the determination-target printer 102 is not capable of the printing in step S708, the printing application 306 returns to step S706 and performs determination for the next local printer. In contrast, when the printing application 306 determines that the determination-target printer 102 is capable of the printing in step S708, the printing application 306 proceeds to step S709 and adds the printer information on the determination-target printer 102 to the printer list. The printer information added in step S709 includes the printer information pieces 425 and the print attributes 426 acquired in step S707. The flow of the printer-list addition process in step S709 is described later with reference to FIG. 8.

Figure 8:
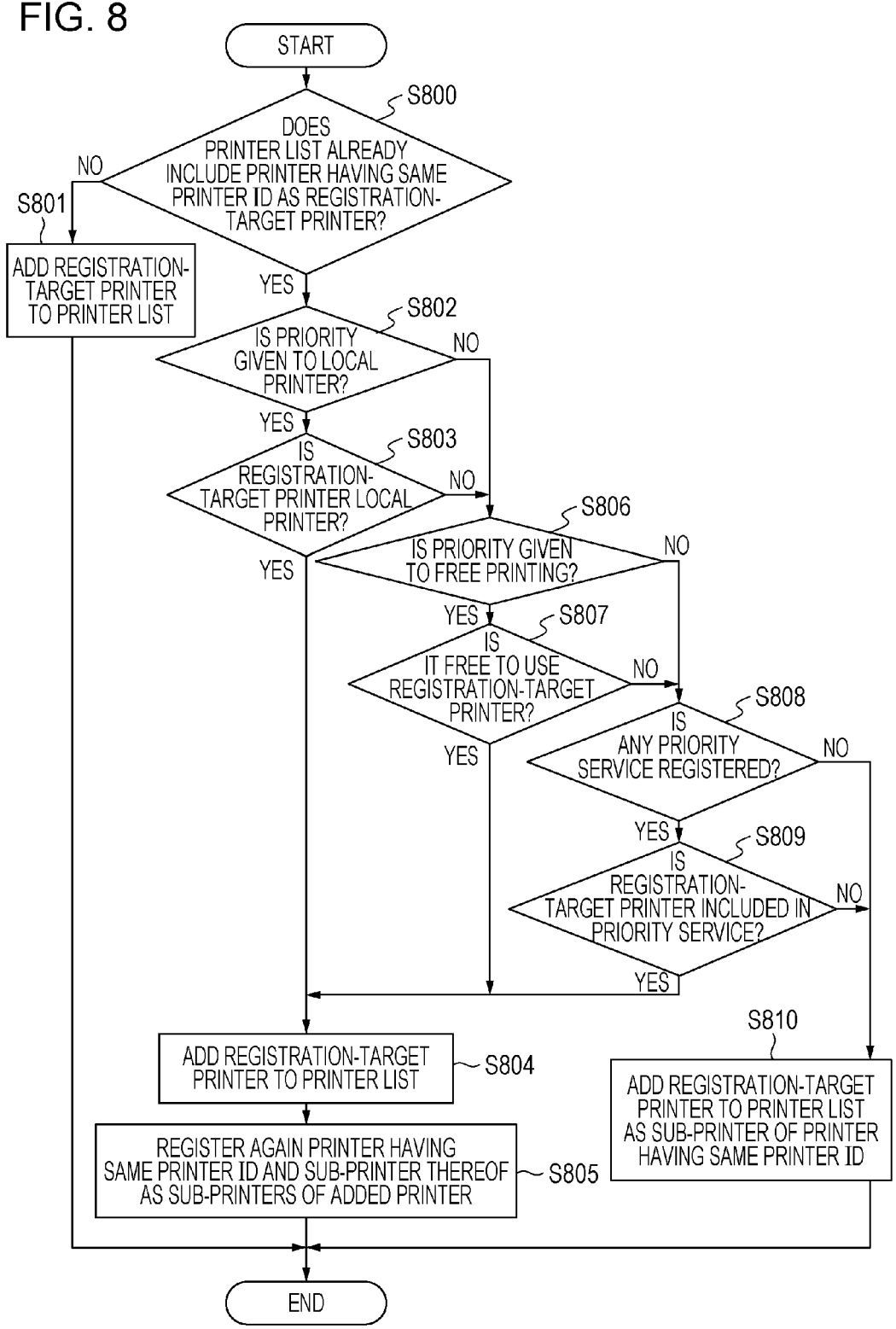
FIG. 8 is a flowchart of a process for adding printer information to the printer list.

FIG. 8 is a detailed flow of the printer-list generation process in which the printing application 306 adds a printer to a printer list that is necessary for displaying the printer list screens 501 and 502. The printer list of this embodiment is displayed in such a way that the same printers among the multiple virtual printers registered in multiple printing services and the printers found in the local-network search are displayed as a group in the form of a drop-down list, as the printer list screen 501 in FIG. 5. In the following description, the printer displayed in the first row in each group is called a main printer, and each printer displayed in one of the subsequent rows is called a sub-printer. In the flow of the printer-list generation process in FIG. 8, the printing application 306 holds printer information pieces on the respective printers to be registered in the printer list. The printer information to be registered is the virtual-printer information piece 400 in the case of a virtual printer and is the printer information piece 425 in the case of a local printer. The flow of the printer-list generation process in FIG. 8 is carried out in the same way in both the case of the process for adding a virtual printer (S703) and the case of the process for adding a local printer (S709).

In step S800, the printing application 306 determines whether the printer list already includes a printer having the same printer ID as the printer ID (402 or 414) included in the printer information of the registration-target printer. When the printing application 306 determines that the printer list does not include any printer having the same printer ID as the printer ID (402 or 414) included in the printer information of the registration-target printer, the printing application 306 proceeds to step S801 and adds the printer information on the registration-target printer to the printer list. In contrast, when the printing application 306 determines that the printer list already includes a printer having the same printer ID as the printer ID (402 or 414) included in the printer information of the registration-target printer, the printing application 306 proceeds to step S802.

In some cases, the same printer is registered separately as virtual printers in multiple respective printing services 105, or a printer is found as a local printer in addition to a virtual printer. In such a case, if a printer is displayed as different printers although the printers are the same, the user becomes confused when choosing a printer, consequently reducing user convenience. To avoid such a situation, in this embodiment, printers having the same printer ID (402 or 414) are determined to be the same printer and are displayed as the same printer to the user. With this configuration, the different printing services that carry out printing using the same printer are displayed together. This makes it easier for the user to choose a printing service for the printing, consequently increasing user convenience.

In step S802, the printing application 306 determines whether the priority information piece 424 indicates that priority is given to a local printer. When determining that priority is given to a local printer, the printing application 306 proceeds to step S803. When determining that priority is not given to a local printer, the printing application 306 proceeds to step S806.

In step S803, the printing application 306 determines whether the registration-target printer is a local printer. The printing application 306 determines that the registration-target printer is a local printer when the printer information on the registration-target printer is the printer information piece 425. When determining that the registration-target printer is a local printer, the printing application 306 proceeds to step S804. When determining that the registration-target printer is not a local printer, the printing application proceeds to step S806.

In step S804, the printing application 306 adds the registration-target printer to the printer list as a main printer. In step S805, the printing application 306 adds again the printer having the same printer ID as the printer ID (402 or 414) of the registration-target printer and the sub-printers of the printer having the same printer ID, to the printer list as sub-printers of the printer registered in step S804.

When priority is given to a local printer, the printing application 306 displays the local printers found in the local search with higher priority than that given to the virtual printers registered in the printing services 105. This makes it possible for the user to easily find local printers from the displayed printer list. In some cases, the user desires to use a local printer with high priority since the printing process using the printing services 105 may take long. In such a case, the user can choose one of the local printers displayed with high priority without becoming confused, consequently increasing user convenience.

In step S806, the printing application 306 determines whether the priority information piece 424 indicates that priority is given to free printing. When determining that priority is given to free printing, the printing application 306 proceeds to step S807. When determining that priority is not given to free printing, the printing application 306 proceeds to step S808.

In step S807, the printing application 306 determines whether the registration-target printer is available free of charge. When determining that the registration-target printer is available free of charge, the printing application 306 proceeds to step S804. When determining that the registration-target printer is not available free of charge, the printing application 306 proceeds to step S808. When the printer information of the registration-target printer is the virtual-printer information piece 400, the printing application 306 determines whether the registration-target printer is available free of charge, on the basis of the charge 412 of the service 410 in which the virtual printer is registered. When the registration-target printer is a local printer (that is, the printer information is the printer information piece 425), the printing application 306 determines that the registration-target printer is available free of charge.

When the priority information 424 is set so that priority is given to free printing, the printing application 306 displays, with high priority, the printers available free of charge. Accordingly, the user can easily find printers available free of charge from the displayed printer list. In some cases, the user using the printing application 306 desires to use a free printing service with high priority in order to give high priority to printing cost. In such a case, the user can choose one of the printers available free of charge, which are therefore displayed with high priority, without becoming confused, consequently increasing user convenience.

In step S808, the printing application 306 determines whether a particular printing service is set as a priority service in the priority information piece 424. When determining that a printing service is set as a priority service, the printing application 306 proceeds to step S809. When determining that no printing service is set as a priority service, the printing application 306 proceeds to step S810.

In step S809, the printing application 306 determines whether the registration-target printer is one of the virtual printers registered in the priority service. To determine this, when the printer information of the registration-target printer is virtual-printer information piece 400, the printing application 306 determines whether the service from which the virtual-printer information piece 400 has been acquired is the same as the priority service set in the priority service information piece 424. In contrast, when the registration-target printer is a local printer (that is, in the case of the printer information piece 425), the printing application 306 determines that the registration-target printer is not a priority service. When determining that the registration-target printer is the virtual printer registered in the priority service in this way, the printing application 306 proceeds to step S804. When determining that the registration-target printer is not the virtual printer registered in the priority service, the printing application 306 proceeds to step S810.

When a priority service is set in the priority information piece 424, the printing application 306 displays the virtual printer registered in the priority service, with high priority. Accordingly, the user can easily find the virtual printer registered in the priority service from the displayed printer list. When the user using the printing application 306 desires to use a certain one of the printing service 105 with high priority, the user can choose, without becoming confused, the virtual printer set in the priority service and displayed with high priority, consequently increasing user convenience.

In step S810, the printing application 306 searches for a printer having the same printer ID as the printer ID (402 or 414) of the registration-target printer from among the printers registered in the printer list and registers the registration-target printer in the printer list as a sub-printer of the printer thus found.

As described above, in this embodiment, when the virtual printers registered in the printing services provided by the companies (vendors) and the printers found in a local search are displayed as a printer list, the printers having the same printer ID are displayed together as a single printer. With this configuration, the different printing services carrying out printing by using the same printer are displayed as a group. This makes it easier for the user to decide upon which printing service to use for printing from among the displayed printing services.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The invention claimed is:

1. A printer list generator comprising:
a memory that stores a computer program; and
a processor that executes the computer program to perform:
searching for virtual printers that have been registered in a plurality of respective printing services, the searched-for virtual printers having printer identifiers (IDs), wherein the searched-for virtual printers are virtual printers capable of printing a document file specified as a print-target document file by a user;
determining groups based on the printer IDs of the searched-for virtual printers, wherein each of the groups includes the searched-for virtual printers having a same printer ID, and wherein the searched-for virtual printers having different printer IDs are determined as belonging to different groups;
generating a printer list that displays the determined groups, wherein the virtual printers included in each group are further displayed using a form of a drop-down list in the printer list; and
controlling a printer so that the printer prints the print-target document file, the printer being specified as a destination printer by the user from the generated printer list.

2. The printer list generator according to claim 1, wherein the processor executes the computer program to further perform:

searching for a local printer connected to a local-area network, wherein each of the determined groups includes both of the searched-for virtual printers having the same printer ID and the searched-for local printer having the same printer ID.

3. The printer list generator according to claim 2, wherein, when setting is made so that a local printer is displayed with high priority, the generated printer list displays, among the virtual printer and the local printer included in each group, the local printer as a main printer and the virtual printer as a sub-printer.

4. The printer list generator according to claim 1, wherein, when setting is made so that a printer available free of charge is displayed with high priority, the generated printer list displays, among the virtual printers included in each group, a virtual printer available free of charge as a main printer and a virtual printer not available free of charge as a sub-printer.

5. The printer list generator according to claim 1, wherein, when a particular printing service among the plurality of printing services is set as a priority service, the generated printer list displays, among the virtual printers included in each group, a virtual printer registered in the particular printing service as a main printer and a virtual printer registered in a printing service different from the particular printing service among the plurality of printing services as a sub-printer.

6. The printer list generator according to claim 1, wherein the virtual printers capable of printing the print-target document file are searched-for according to setting of a print attribute specified by the user.

7. The printer list generator according to claim 1, wherein, when the specified printer is capable of directly printing the print-target document file, the processor directly transmits the print-target document file to the specified printer and controls the printer so that the printer prints the print-target document file.

8. The printer list generator according to claim 1, wherein, when the specified printer has a cloud printing function, the processor transmits the print-target document file to a printing service corresponding to the specified printer among the plurality of printing services and controls the printer so that the printer directly downloads and prints print data generated by converting the print-target document file by the printing service.

9. The printer list generator according to claim 1, wherein, when the specified printer does not have a cloud printing function, the processor transmits the print-target document file to a printing service corresponding to the specified printer among the plurality of printing services, downloads print data generated by converting the print-target document file by the printing service, and transmits the downloaded print data to the printer and controls the printer so that the printer prints the print data.

10. The printer list generator according to claim 1, wherein the plurality of printing services are connected to each other via the Internet.

11. The printer list generator according to claim 1, wherein the printer list generator is a mobile terminal.

12. A non-transitory computer-readable medium storing a program for causing a computer to perform:

searching for virtual printers that have been registered in a plurality of respective printing services, the searched-for virtual printers having printer identifiers (IDs), wherein the searched-for virtual printers are virtual printers capable of printing a document file specified as a print-target document file by a user;

determining groups based on the printer IDs of the searched-for virtual printers, wherein each of the groups includes the searched-for virtual printers having a same printer ID, and wherein the searched-for virtual printers having different printer IDs are determined as belonging to different groups;

generating a printer list that displays the determined groups, wherein the virtual printers included in each group are further displayed using a form of a drop-down list in the printer list; and controlling a printer so that the printer prints the print-target document file, the printer being specified as a destination printer by the user from the generated printer list.

13. A printer list generation method executed by an apparatus, the method comprising:

searching for virtual printers that have been registered in a plurality of respective printing services, the searched-for virtual printers having printer identifiers (IDs), wherein the searched-for virtual printers are virtual printers capable of printing a document file specified as a print-target document file by a user;

determining groups based on the printer IDs of the searched-for virtual printers, wherein each of the groups includes the searched-for virtual printers having a same printer ID, and wherein the searched-for virtual printers having different printer IDs are determined as belonging to different groups;

generating a printer list that displays the determined groups, wherein the virtual printers included in each group are further displayed using a form of a drop-down list in the printer list; and controlling a printer so that the printer prints the print-target document file, the printer being specified as a destination printer by the user from the generated printer list.

14. The printer list generation method according to claim 13, further comprising searching for a local printer connected to a local-area network, wherein each of the determined groups includes both of the searched-for virtual printers having the same printer ID and the searched-for local printer having the same printer ID.

* * * * *